Patented Aug. 4, 1953

2,647,926

UNITED STATES PATENT OFFICE 2,647,926

DIPHENYL-DIMETHYL-AMINOVALERAMIDE

Merrill Eugene Speeter, Kalamazoo, Mich., assignor to Bristol Laboratories Inc., Syracuse, N. Y., a corporation of New York No Drawing. Application June 12, 1952,
Serial No. 293,195

5 Claims. (Cl. 260—558)

This application is a continuation-in-part of my co-pending application of Serial Number 126,045, filed November 7, 1949, and Serial Number 187,656, filed September 29, 1950, both now abandoned.

This invention relates to a new organic compound of therapeutic value and a method for the preparation thereof. More particularly, this invention relates to $\alpha,\alpha$-diphenyl-$\gamma$-dimethylaminovaleramide and non-toxic organic and inorganic acid addition salts thereof.

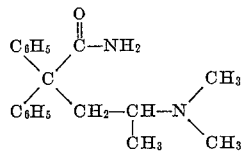

The compounds of the present invention possess therapeutic utility by virtue of their lack of toxicity and their ability to suppress gastric secretion of acid and to dilate the pupil of the eye. These activities have been reported in detail by Wellum and Pollard (J. Lab. and Clin. Med., August 1951) and by Drucher and Cazort (Archives of Ophthalmology, June 1951) respectively.

The following examples will serve to illustrate the invention without limiting it thereto.

EXAMPLE I $\alpha,\alpha$-Diphenyl-$\gamma$-dimethylaminovaleramide

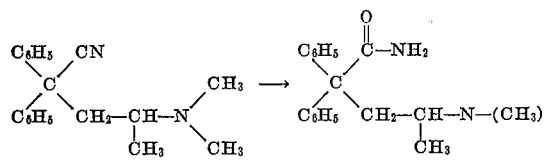

METHOD A

A mixture of 14 grams (0.05 mole) of $\alpha,\alpha$-diphenyl-$\gamma$-dimethylaminovaleronitrile, 16 grams (0.2 mole) of sodium acetate, 14 grams (0.2 mole) of hydroxylamine hydrochloride and 75 ml. of ethyl alcohol was refluxed 18 hours. The mixture was cooled, poured into water and neutralized with ammonium hydroxide. The heavy white precipitate solidified on standing. The material was filtered and recrystallized from isopropanol. After three recrystallizations the product melted at 177°–179° C.

Analysis.—Calculated for $C_{19}H_{24}N_2O$:

|   | Calculated | Found |       |
|---|------------|-------|-------|
| C | 76.96      | 76.90 | 76.90 |
| H | 8.16       | 8.02  | 8.10  |
| N | 9.44       | 9.27  | 9.11  |

METHOD B

Forty-five ml. of concentrated sulfuric acid (98%) was diluted with 5 ml. of water to give a solution of approximately 92% sulfuric acid. To this was added five grams (0.018 mole) of $\alpha,\alpha$-diphenyl-$\gamma$-dimethylaminovaleronitrile. The mixture was heated on a steam bath two hours and was then cooled. The mixture was poured onto ice and neutralized with concentrated ammonium hydroxide. The white solid was filtered and recrystallized from isopropyl alcohol. The material melts at 177°–179° C. and this value was not changed when a sample was mixed with the product from method (A).

EXAMPLE II

Alpha, alpha-diphenyl-gamma-dimethylaminovaleramide acid sulfate hydrate 252.0 grams (0.85 mole) of alpha, alpha-diphenyl-gamma-dimethylaminovaleramide was dissolved in 1 liter of isopropanol, and 70 ml. of concentrated sulfuric acid was added as rapidly as possible. The mixture was heated until clear, then filtered and diluted with 1500 ml. of anhydrous ethyl acetate. The solution was cooled and filtered, and the white crystalline product was dried in vacuo over $P_2O_5$.

Weight: 259.5 g.; M. P. 181.5°–182° C. (gas evolution).

EXAMPLE III

Alpha, alpha-dipenyl-gamma-dimethylaminovaleramide hydrochloride

A solution of 11.0 g. (0.037 mole) of alpha, alpha-diphenyl-gamma-dimethylaminovaleramide in 250 ml. of dry chloroform was saturated with dry hydrogen chloride, and the chloroform was removed by distillation. The residual glassy solid was recrystallized from absolute ethanol-ether and dried in vacuo over $P_2O_5$. It was quite hygroscopic. Yield: 10.2 g.; M. P. 190.5°–191.5° C. (gas evolution).

*Analysis.*—Calculated for $C_{19}H_{25}ClN_2O$:

|   | Calculated | Found |
|---|---|---|
| C | 68.5 | 67.9 |
| H | 7.56 | 7.48 |

The invention also includes the non-toxic, organic and inorganic acid addition salts of the compound having the general formula above such as will be readily formed with, for example, organic and inorganic acids such as hydrochloric, sulfuric, sulfamic, tartaric, hydrobromic, hydriodic, glycolic, citric, maleic, phosphoric, succinic, acetic, benzoic, cinnamic, mandelic, malic, ascorbic, and the like. The method of preparation of these salts is made apparent in the examples above.

I claim:

1. A new class of compounds consisting of the free base and the non-toxic acid addition salts thereof, said free base having the formula

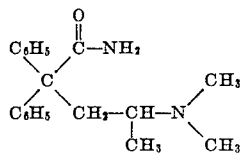

2. The non-toxic acid addition salts of α,α-diphenyl-γ-dimethylaminovaleramide.

3. The compound

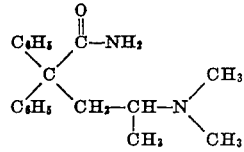

α,α-diphenyl-γ-dimethylaminovaleramide.

4. The compound α,α-diphenyl-γ-dimethylaminovaleramide acid sulfate hydrate.

5. The compound α,α-diphenyl-γ-dimethylaminovaleramide hydrochloride.

MERRILL EUGENE SPEETER.

References Cited in the file of this patent

FOREIGN PATENTS

| Number | Country | Date |
|---|---|---|
| 882,283 | France | Feb. 22, 1943 |

OTHER REFERENCES

Krieble et al.: "J. Am. Chem. Soc.," (vol. 61, p. 561), 1939.

Migrdichian: "The Chemistry of Organic Cyanogen Compounds," p. 37, 1947.

Gardner et al.: "J. Am. Chem. Soc.," vol. 70, p. 2906, 1948.

Bockmuhl et al.: "Liebigs Annalen," vol. 561, pp. 53, 54, 67, 78, and 85, Nov. 1948.